Aug. 27, 1929.  E. HARMES  1,726,023
MOLDING MACHINE
Filed Oct. 19, 1926  4 Sheets-Sheet 1
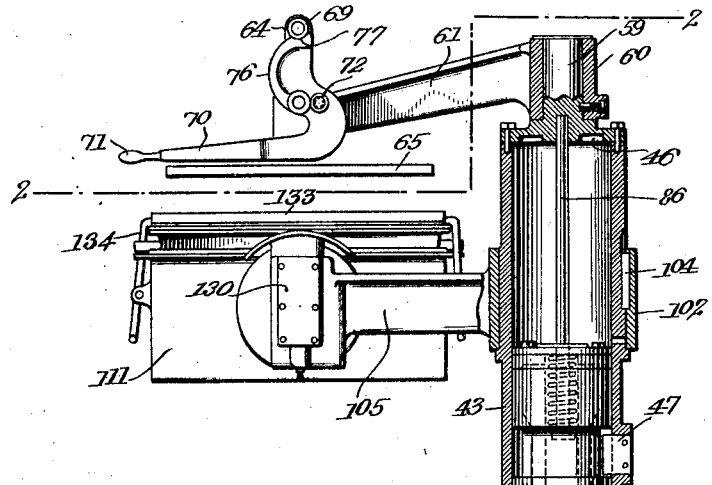
Fig. 1.
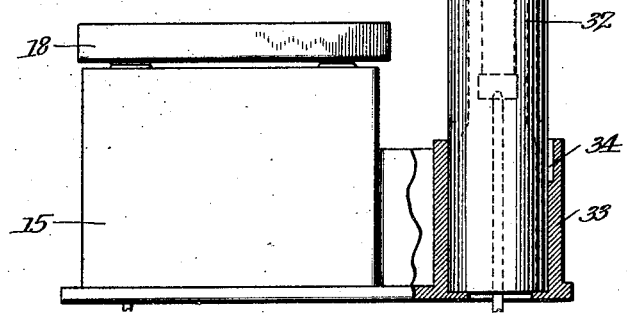
Fig. 2.
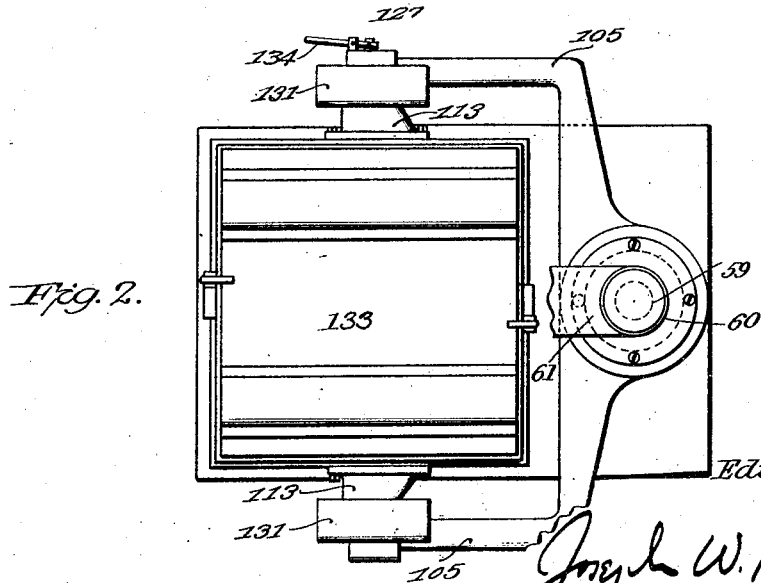
Inventor
Edward Harmes
Joseph W. Hazell
Attorney

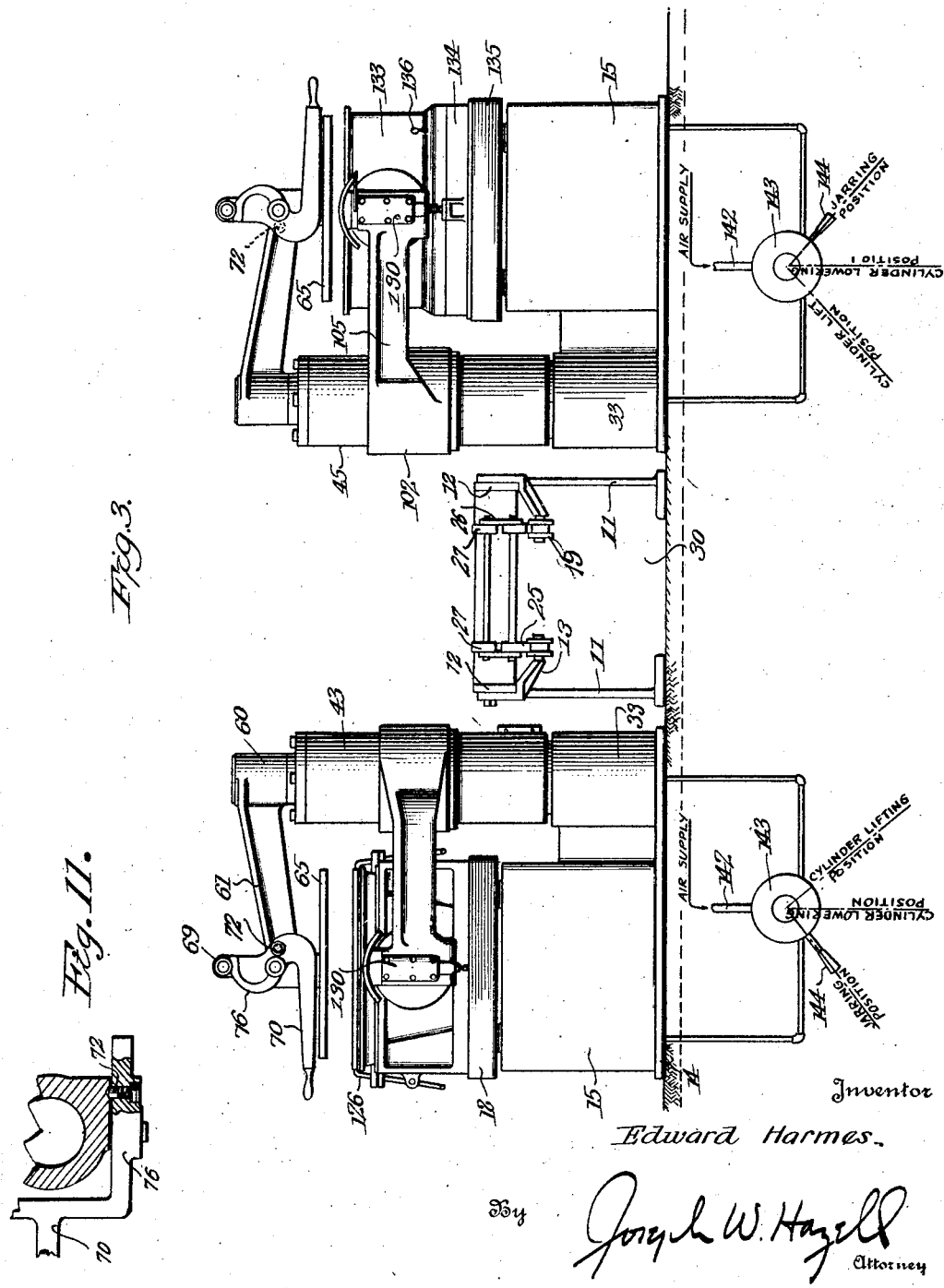

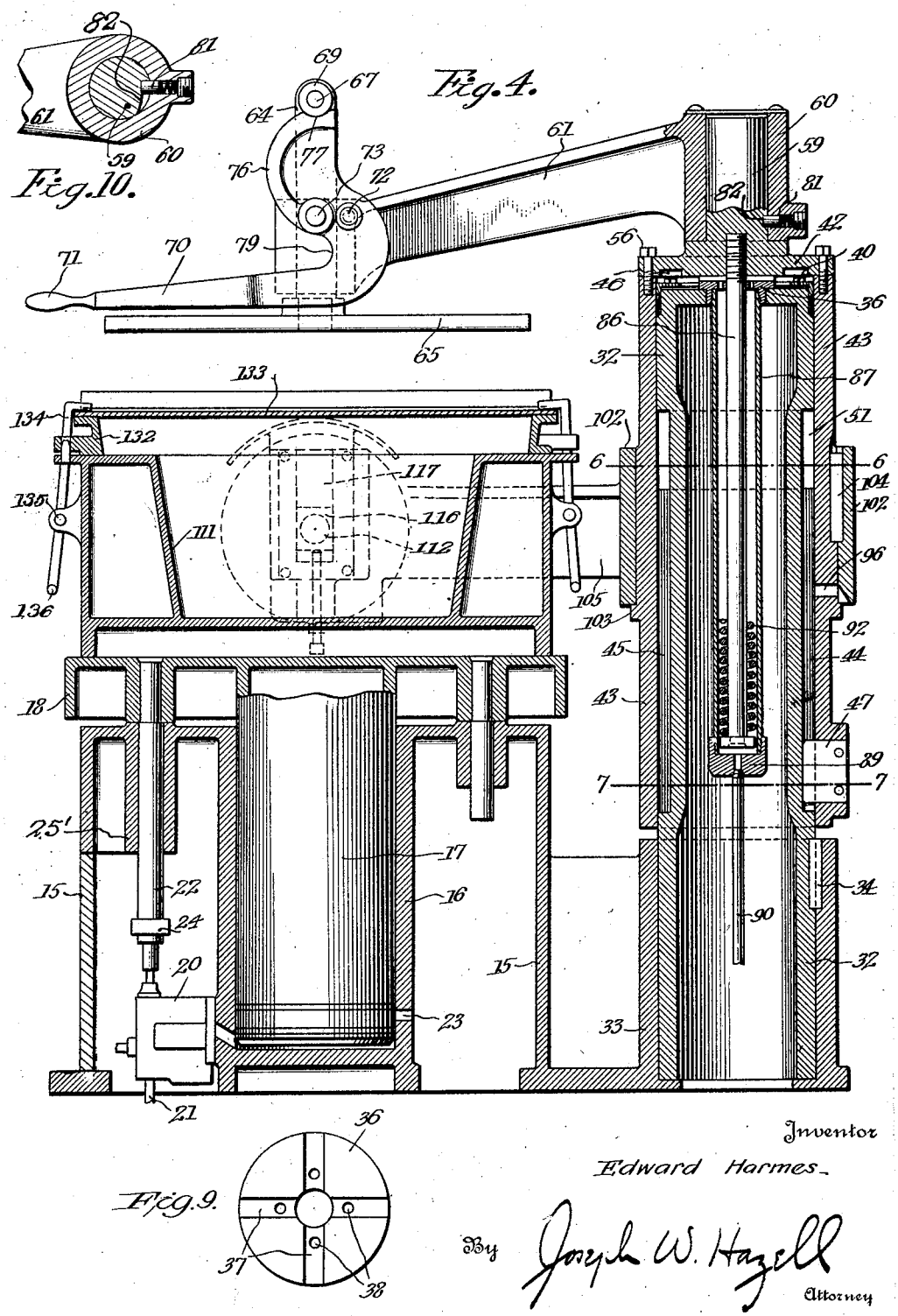

Aug. 27, 1929.   E. HARMES   1,726,023
MOLDING MACHINE
Filed Oct. 19, 1926   4 Sheets-Sheet 4
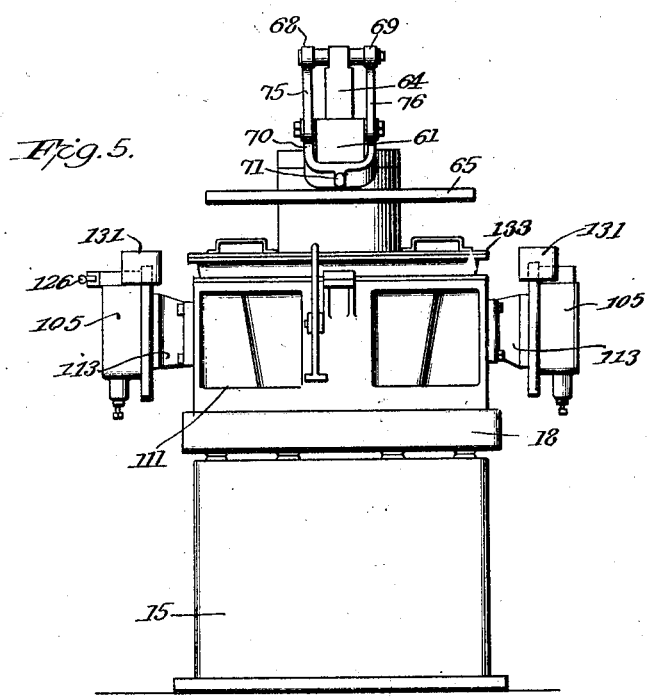
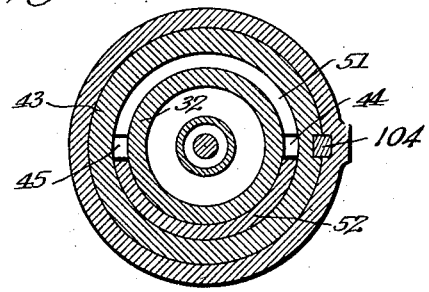
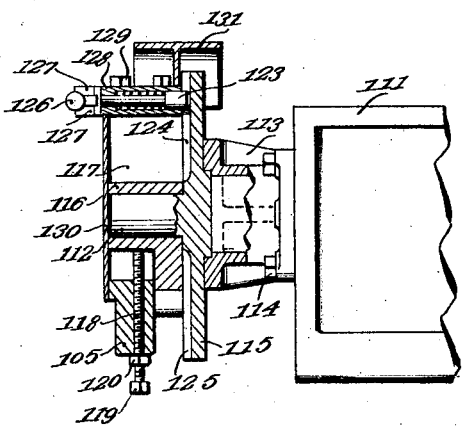
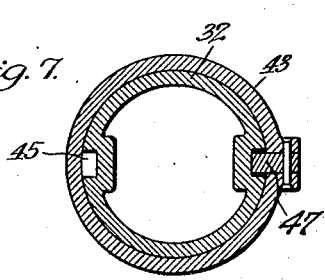
Inventor
Edward Harmes
By Joseph W. Hazell
Attorney Patented Aug. 27, 1929.

1,726,023

UNITED STATES PATENT OFFICE.

EDWARD HARMES, OF WILKINSBURG, PENNSYLVANIA, ASSIGNOR TO NEW PROCESS MULTI-CASTINGS COMPANY, A CORPORATION OF NEW JERSEY.

MOLDING MACHINE.

Application filed October 19, 1926. Serial No. 142,540.

The present invention relates to mold making machines and particularly to the class of machines where one or more of the flask parts are attached to the machine.

It is one object of the invention to provide flask handling mechanism which not only carries the flask, but permits it to be jolted or jarred with respect to said flask carrying means and also permits the flask to be rolled over with respect to said flask carrying means.

Another object of the invention is to provide a machine of the class described in which the flask is permanently attached to the machine, the word "permanently" being used in the sense that with one flask, attached to the machine, any desired number of molds are made without removing the flask, though it will be understood that where a mold of different size or shape is required, a different flask may be substituted in the machine.

A further object of the invention is to provide a machine with flask raising and lowering means and pattern drawing means including a pair of relatively movable members having relatively great surface contact and which are so arranged that the greatest area of contacting or gripping surfaces exists at the moment of beginning to draw the pattern, thus providing the greatest degree of rigidity in the structure at the moment when it is most needed.

A still further object of the invention is to provide, in addition to the operating or jarring table, flask raising and lowering mechanism including a stationary piston and a cylinder axially and circumferentially movable with respect thereto and actuated by fluid under pressure, such as air.

Other and further objects and advantages of the invention will appear from the following detailed description, taken in connection with the accompanying drawings, which illustrate, by way of example, one preferred embodiment of the invention and in which:

Fig. 1 is a side elevation, partly in section, of a part of a molding machine, embodying the present invention;

Fig. 2 is a top plan view of the mechanism of Fig. 1 taken on the line 2—2 of Fig. 1;

Fig. 3 is a side elevation, on a reduced scale, of a complete machine embodying the present invention, with the air supply and control illustrated diagrammatically;

Fig. 4 is a central vertical section of the machine of Fig. 1, showing the flask in lowered position;

Fig. 5 is an end elevation, on a reduced scale, of the machine of Fig. 1;

Fig. 6 is a horizontal sectional view taken on the line 6—6 of Fig. 4;

Fig. 7 is a horizontal sectional view taken on the line 7—7 of Fig. 4;

Fig. 8 is an enlarged vertical section, partly broken away, illustrating the flask carrying arm and a portion of the flask associated therewith;

Fig. 9 is a top plan view of the piston head plug;

Fig. 10 is a horizontal sectional detail view of the squeeze head stop detent.

Fig. 11 is a sectional detail view through the packing plate raising and lowering mechanism.

Referring in detail to the drawings, and particularly to Fig. 3, the present invention is herein illustrated as being embodied in a so-called double machine, that is to say, a machine in which one portion of the mechanism makes a drag mold while another portion makes the cope mold, the mold sections being then assembled together on an assembling and transfer member, which removes the closed and stripped mold for pouring.

Accordingly, in Fig. 3 there is illustrated an end view of a mold assembling and transfer device, indicated generally at 30, which may, for example, be similar to or the same as the mold assembling and transfer table of my copending application Serial No. 144,515, filed Oct. 27, 1926. In the present embodiment of the invention this table may comprise vertical side standards 11 carrying at their upper ends the pair of longitudinally extending parallel stationary rails 12, to which are secured the downwardly and inwardly extending brackets 13, carrying the grooved rollers 19 upon which a lower pair of connected parallel guide rails 25 are adapted to travel back and forth. Secured by links 26 to the rails 25 are an upper pair of connected parallel mold lifting and transfer rails 27, adapted at times to descend and rest upon the lower guide rails 25, lowering a mold upon the stationary rails 12, and at times of lift the mold from said stationary rails and carry it away from the machine.

Referring now particularly to the portion of the machine for making the drag mold, this being illustrated on the left of the assembling and transfer table 30, as viewed in Fig. 3, and being further illustrated in the remaining figures of the drawing, upon a suitable foundation is mounted the base 14 which supports the jarring table casing 15, within which is located a stationary cylinder 16, which receives the movable piston 17, upon the top of which is carried the operating or jarring table 18. Within the casing 15 is also located an automatic jarring valve mechanism including a valve casing 20, an air inlet pipe 21 and a reversing rod 22 secured to the table top 18, the details of this valve mechanism being more specifically described and claimed in my copending application Serial No. 142,167, filed Oct. 18, 1926. An exhaust port 23 is provided in the stationary cylinder 16 near the bottom thereof for the purpose of providing a safety exhaust port for the lifting air at the upward limit of the jarring stroke, and the head 24 of rod 22 serves as a positive safety limit to the upward stroke by contacting with the boss 25'.

Coming now more particularly to the subject-matter of the present invention, a stationary piston 32 is fixedly mounted to the base of the machine within a deep annular flange 33, to which the piston is keyed, as at 34, to prevent relative movement of the piston with respect to the base of the machine. The upper end of the piston 32 is provided with a central opening, within which is secured a threaded abutment plug 36, the upper surface of which is illustrated in Fig. 9 as being provided with radial channels or grooves 37 and air inlet ports 38. A packing plate 40 is provided on the top surface of the upper end of the piston 32, secured thereto by bolts or other means, and the under side of the cylinder head 42 is recessed, as at 46, to provide clearance for such bolts and to permit the cylinder head, in lowered position, to abut against the upper face of the plug 36, upon which the weight of the cylinder 43 is carried in the lowermost position of said cylinder.

A guiding lug 47, secured to the cylinder 43 and projecting inwardly thereof, is adapted to travel vertically in either of two longitudinally extending grooves 44 and 45 provided in the present instance 180° apart in the outer circumferential surface of the piston 32. At the upper end of the piston 32, an annular groove 51 is provided, approximately one-half of which, as shown in Fig. 6, is filled by a semicircular filling member 52, which leaves a semicircular passage at the upper end of the piston connecting the two longitudinal grooves 44 and 45. It will thus be seen that the lug 47, traveling vertically in groove 44, guides the cylinder as the flask is raised and lowered over the operating table and that when the cylinder is in its upper position with respect to the piston, the lug 47, entering the semicircular groove 51, may travel circumferentially therearound as the cylinder revolves in a semicircle with respect to the piston until the lug 47 arrives above the vertical groove 45, at which time the cylinder, having moved through 180° in the present embodiment of the invention and carrying the flask with it, may be lowered to deposit a mold section on the assembling table 11 and being guided vertically in its downward movement by the longitudinal groove 45, in which the guide lug 47 travels. Obviously, the reverse of these movements will bring the cylinder again to the position of Fig. 4.

The end plate 42 is secured to the cylinder 43 by bolts 56 or other suitable means with suitable packing if desired to provide an airtight connection. A cylindrical projection 59 on the upper end of the plate 42 revolubly carries the sleeve portion 60 of an arm 61, to the outer end of which is secured, for reciprocating movement in said arm, a vertical shaft 64, guided vertically by a suitable key, and to the lower end of which is mounted a flat packing plate 65. The upper end of the shaft 64 is provided with a horizontal cam roller shaft 67, upon the outer ends of which are revolubly mounted cam rollers 68 and 69. A cam lever 70, provided with a handle 71 and a holding detent 72, is pivotally mounted at 73 to the outer end of the arm 61 and is provided with the cam surfaces 75 and 76, having upper roller receiving holding depressions 77 and which bear upon the cam rollers 68 and 69 for the purpose of raising and lowering the shaft 64, and consequently the packing plate 65. In the position of Fig. 4, the packing plate 65 is in raised or inoperative position. By releasing the detent 72 and raising the handle 71, thus moving the cam lever 70 in an arc about the axis 73, the cam rollers 68 and 69 ride downwardly upon the cam surfaces 75 and 76 and come to rest in the pockets at the end of the cam surfaces, one of these pockets being indicated at 79 in Fig. 4, and the detent 72 holding the lever 70 in raised position with the rollers 68 and 69 clear of the cams 75 and 76. The packing plate 65 is thus lowered after sand has been placed in the flask and the flask is ready to be jarred. The packing plate 65 rests upon the top of the sand and is raised and lowered with it during the jarring operation, following the sand downwardly and packing it into the flask at the end of each jarring stroke. In order that the arm 61 and its associated packing mechanism may be swung away from its position directly over the flask and maintained in such position while the flask is being filled with sand or rolled over, a spring-pressed detent 81 is provided, which is in the present instance adapted to enter a groove 82 formed in the cylindrical projection 59, and to stop the packing plate and position it accurately over the flask.

Projecting downwardly from the end plate 42 of the cylinder and passing through the head 36 of the piston, is a rod 86, which extends loosely within a cylindrical casing 87 screw-threaded into and projecting downwardly from the head 36 and extending axially within the piston 32. The casing 87 is open at its upper end to the ports 38 and serves to carry air to said ports for admission into the expansible chamber formed between the piston and cylinder. A cap 89 is threaded on the bottom of the casing 87 and is provided with an air port to which is connected a pipe 90 leading to a source of air or other fluid under pressure.

Cushioning means in the form of a coil spring 92 is provided surrounding the rod 86 and resting on a head provided at the lower end of said rod. When the cylinder approaches its upper position with respect to the piston it carries upwardly with it the rod 86, and the upper end of the coil spring 92 abuts against the underside of the head 36 and acts as a cushioning means or shock absorber as the cylinder approaches the limit of its upward movement.

A safety air exhaust port 96 is provided in the cylinder wall, and when the cylinder is raised far enough to bring the port 96 beyond the upper end of the piston, the air exhaust from the expansible chamber through this port prevents the cylinder from being raised beyond a predetermined position, that is to say, far enough to permit the guiding lug 47 to be received within the semicircular passage 51.

A sleeve 102 fits closely around the cylinder 43 and rests upon an annular shoulder 103 provided on the cylinder. A key 104 locks the sleeve 102 and cylinder 43 against any movement with respect to each other. Formed on or projecting from the sleeve 102 are a pair of flask carrying arms 105.

The invention provides means whereby the flask may be jolted or jarred with respect to the arms 105 and may also be rolled over while being supported therein.

Accordingly, referring to Figs. 1, 2, 4, 5 and 8, in the drag mold forming part of the machine, a drag pattern 111 is located between and carried by the arms 105 in the following manner: Projecting from the drag pattern plate at opposite sides thereof are trunnions 112, which are attached to the drag pattern plate in any suitable manner, such as by means of the brackets 113 secured by bolts 114 or otherwise, one on each side of the drag pattern 111, each bracket 113 in turn being bolted or otherwise suitably secured to the inner vertical face of a disc plate 115. The opposite or outer face of the plate 115 is provided with the trunnion 112, which is rotatably received within a cylindrical bearing opening provided in a jarring guide block 116. The guide block 116 is of rectangular form, generally, and is slidably received for reciprocating movement in the vertical guide bearing 117 provided in the outer end of each flask supporting arm 105. A vertical stop screw 118 having a head 119 and lock nut 120 is provided at the lower and outer end of each arm 105, and bears against the under side of each vertically movable guide block 116 to lift it when the arms 105 are lifted with respect to the table 18, but is spaced from the guide block 116 when the flask rests on the table 18 and during jarring.

The invention provides means for guiding the flask vertically in upright or inverted position, and for this purpose, in the present embodiment of the invention, one of the arms 105 (see Fig. 8) is provided with the horizontally arranged spring-pressed detent 123, which is adapted to enter either of two guiding grooves 124 or 125, provided radially in the outer face of the disc plate 115. An operating lever 126 is preferably provided having pin and slot connection with the detent 123, and is shown (Figs. 2 and 8) as being mounted between lugs 127 projecting horizontally from the top cover plate 128 overlying the guide bearing 117 and secured, as by bolts 129, to the arm 105. It will be apparent that when the detent is released, the flask is free to be rolled over, and that during jarring the detent 123 rides in either of the grooves 124 or 125. The arrangement comprising detent 123, lever 126 and plate 128 is for the purpose of preventing rotation of the flask when the flask has left the table, or to make the flask register to an exact position of level; it is not particularly for the purpose of guiding the flask during the jarring movement, since the flask can not rotate when it is lying on the table, but is provided more particularly to prevent the flask from rotating or getting out of register after the flask has been raised above the table by the cylinder 43. A side cover plate 130 is provided on the outer side of each arm 105, to close the lateral opening of the guide bearing 117. A sand shield 131 is provided at the outer end of each arm 105 and is located over the foregoing mechanism, to deflect sand from it during the filling of the flask.

Except for the detent 123, the foregoing mechanism is provided for each arm 105.

Referring to Fig. 4, the drag member 132 of a flask is shown resting on the pattern 111 and positioned with respect thereto by the usual positioning pins. A bottom board 133 is shown as resting on the drag 132, and the bottom board and drag are secured to the pattern by the retaining hooks 134 pivoted at 135 on lugs projecting from the pattern plate and provided with handles 136 by which they may be readily moved.

Referring to Fig. 3, the cope mold forming portion of the machine is similar to the construction hereinabove described, except that the arms 105 support the cope 133 in the same manner in which the drag pattern 111 is supported, the cope pattern 134 being secured upon the cope mold operating table 135, the usual positioning pins being provided to locate the cope on its pattern, and any suitable form of sand-retaining slides operated by a lever 136 being provided to retain the sand in the cope when the cope mold is stripped of its pattern. It will be obvious that the cope mold is formed in a manner similar to the drag mold by jarring, and the jarring may or may not be effected with the aid of the packing follower plate 65.

Still referring to Fig. 3, an air supply pipe 142 is provided which leads from a suitable source of air under pressure to a valve 143 provided with an operating handle 144 adapted to occupy any one of three different positions. The control handle 144 may be actuated to deliver a supply of air to the operating table passing through the valve 20, which automatically effects continuous jarring until the handle 144 is moved to its middle position, as seen in Fig. 3. The handle 144 is also adapted to be moved in the opposite direction to admit air into the expanding chamber between the cylinder 43 and the piston 32 for the purpose of raising the flask parts, and to be moved again to middle or neutral position to exhaust air from the expansible chamber to lower the flask parts. The vertically moving packing follower plate 65 is moved manually into its position above the filled flask 132, and is held in this position by the detent 81, or may be moved away from this position and held in inoperative position when the detent 81 rides out of its groove 82.

It is believed that the operation of the machine will be obvious from the foregoing description. Briefly stated, the steps in making the mold are as follows:

With the follower plate 65 in inoperative position and the drag pattern in the position of Fig. 4, the drag 132 is placed on the drag pattern and filled with sand. The follower packing plate 65 is now brought over the sand, and the lever 70 raised to release and lower the plate 65 upon the sand, detent 72 holding lever 70 in raised position. The valve 143 is then operated to admit air into the cylinder 16 for continuous jarring, the guide blocks 116 rising and falling in the trunnion guides 117, and the detent 123 in guide groove 124, insuring absolute rectilinear movement of the flask. The follower plate 65 packs the sand so that no hand ramming is required. After the sand has been sufficiently packed, the valve 143 is brought to neutral position and the packing follower plate 65 is raised by cam lever 70 and then swung to inoperative position. The surplus sand is struck off in the usual manner and the bottom board placed in position and secured by retaining hooks 134. Air is admitted by the valve 143 to the cylinder 43 above the piston 32, thus raising the cylinder, arms 105 and the drag mold until the cushioning spring 92 functions as before described, and the exhaust port 96 passes above the upper end of the piston. The parts are now in the position of Fig. 1, except that the plate 65 has been rotated to inoperative position. The lug 47 is now opposite the semi-circular passage 51, and the cylinder, together with the arms 105 and drag mold, may be rotated through 180° to a position over the assembling table 30. The drag parts may now be rolled over. By moving the valve 143 to neutral position, the cylinder 43 is lowered until the bottom board 133 rests on the assembling table. The retaining hooks 134 are now released and the pattern drawn by raising the cylinder 43 as before described, leaving the drag mold, drag and bottom board resting on the assembling table. It will be noted that at the moment of drawing the pattern, the cylinder and piston are in their most rigid relation, in other words, in their position of greatest grip and surface contact, thus providing what is so essential to successful operation, the assurance of absolute rigidity at the moment when the pattern is drawn. The drag parts are again brought to their former position, and the making of another drag mold is then commenced. Meanwhile the cope mold has been made and the cope pattern drawn by raising the cope cylinder, lifting the cope off its pattern, then swinging around the cope cylinder to bring the cope over the operating table. The cylinder is lowered until the mold is closed, the cope sand-retaining slides are released and the mold stripped by raising the cope cylinder. If the drag has not been removed, it is now lifted off, and the completed or assembled mold is provided with a pouring jacket and removed on the bottom board from the assembling table for pouring.

It will be seen that by the foregoing construction there is provided flask handling mechanism which not only carries the flask, but permits it to be jolted or jarred with respect to the flask carrying mechanism, permits the flask to be guided in absolutely rectilinear movement during jarring and at the same time permits the flask to be rolled over readily. The foregoing mechanism also provides a particularly efficient pattern draw in that the flask lifting cylinder is in maximum engagement with its piston at the moment of drawing the pattern, thus providing a particularly rigid construction insuring that there will be no defacement of the mold when the pattern is drawn. The foregoing mechanism is combined in a machine provided with a single flask for the making of a plurality of molds. The cope and drag molds may be made at the same time, and the molds deposited upon the assembling table clear of the flask parts and removed, the flask parts being immediately used for the production of further molds.

What is claimed is:

1. In a molding machine having an operating table, flask handling and pattern drawing mechanism including a stationary member, a rotatable and vertically movable member having flask carrying means associated therewith, a flask carried by said movable member and rotatable with it in a horizontal plane about said stationary member, one of said members receiving therewithin the other member and forming therewith an expansible chamber, the area of contact between said members being greatest at the moment of beginning to draw said pattern.

2. In a molding machine having an operating table, flask handling mechanism including a stationary member, a movable member having associated therewith means for rotatably carrying a flask, one of said members telescoping into the other and forming therewith an expansible chamber, means for introducing fluid under pressure into said chamber, and means for guiding one of said members circumferentially about the other.

3. In a molding machine having an operating table, flask handling mechanism including a stationary member, a movable member having associated therewith means for rotatably carrying a flask, one of said members telescoping into the other and forming therewith an expansible chamber, means for introducing fluid under pressure into said chamber, means for guiding one of said members longitudinally with respect to the other, and means for guiding one of said members circumferentially about the other.

4. In a molding machine having an operating table, flask handling mechanism including a piston, a cylinder movable vertically and rotatably with respect to said piston, a pattern carried by said cylinder and rotatable about a horizontal axis, said piston and cylinder forming an expansible chamber, and means for introducing fluid under pressure thereinto.

5. In a molding machine having an operating table, flask handling mechanism including a stationary piston, a cylinder movable longitudinally and circumferentially with respect to said piston, a flask rotatably carried by said cylinder, said piston and cylinder forming an expansible chamber, and means for introducing fluid under pressure thereinto.

6. In a molding machine having an operating table, flask handling mechanism including a piston, a cylinder movable vertically and rotatably with respect to said piston and having associated therewith means for rotatably carrying a flask, said piston and cylinder forming an expansible chamber provided with a spacing device, and means for introducing fluid under pressure through said piston and into said chamber.

7. In a molding machine having an operating table, flask handling mechanism including a piston, a cylinder rotatable with respect to said piston and having a pair of arms fixed thereto provided with means for rotatably carrying a flask, said piston and cylinder forming an expansible chamber, and means for introducing fluid under pressure thereinto.

8. In a molding machine having an operating table, flask handling mechanism including a piston, a cylinder rotatable and vertically movable with respect to said piston and having a pair of arms fixed thereto provided with means for carrying a flask, a flask carried by said arms and vertically movable with respect thereto, means operable at a predetermined position of said cylinder permitting said cylinder to move said flask horizontally away from said operating table, said piston and cylinder forming an expansible chamber, and means for introducing fluid under pressure thereinto.

9. In a molding machine having an operating table, flask handling mechanism including a piston, a cylinder movable with respect to said piston and having a pair of arms fixed thereto provided with means for carrying a flask, a flask carried by said arms and rotatably and vertically movable with respect thereto, means for guiding said cylinder vertically with respect to said piston, means for guiding said cylinder in rotatable movement about said piston, and means for guiding said cylinder vertically after partial rotation about said piston, said piston and cylinder forming an expansible chamber, and means for introducing fluid under pressure thereinto.

10. In a molding machine having an operating table, flask handling mechanism including a piston, a cylinder movable with respect to said piston and having associated therewith means for rotatably carrying a flask, said piston and cylinder forming an expansible chamber, means for introducing fluid under pressure thereinto, cushioning means movable with said cylinder and lying within said piston, and a safety exhaust port in said cylinder for limiting the expansion of said chamber.

11. In a molding machine having an operating table, flask handling mechanism including a vertically movable member provided with flask carrying means having vertical guideways therein, bearing blocks vertically movable in said guideways during jarring, and a flask carried by said bearing blocks.

12. In a molding machine having a jarring table, flask handling mechanism including a vertically movable member provided with flask embracing and lifting means having vertical guideways therein, means closing the upper end of said guideways, bearing blocks vertically movable in said guideways during jarring, and a flask carried by said bearing blocks.

13. In a molding machine having a jarring table, flask handling mechanism including a vertically movable member provided with flask embracing and lifting means having vertical guideways therein, means closing the upper end of said guideways, bearing blocks vertically movable in said guideways during jarring, and a flask rotatably carried by said bearing blocks.

14. In a molding machine having a jarring table, flask handling mechanism including a vertically movable member provided with flask lifting means having vertical guideways therein, bearings vertically movable in said guideways during jarring, mold forming means rotatably carried by said bearing blocks, and means guiding said mold forming means vertically during jarring.

In testimony whereof I affix my signature.

EDWARD HARMES.